(12) United States Patent
Brown

(10) Patent No.: US 7,990,958 B2
(45) Date of Patent: *Aug. 2, 2011

(54) METHOD AND APPARATUS FOR A FOUR-WAY HASH TABLE

(75) Inventor: David A. Brown, Carp (CA)

(73) Assignee: SAtech Group, A.B. Limited Liability Company, Wilmington, DE (US)

( * ) Notice: Subject to any disclaimer, the term of this patent is extended or adjusted under 35 U.S.C. 154(b) by 1635 days.

This patent is subject to a terminal disclaimer.

(21) Appl. No.: 11/069,635

(22) Filed: Feb. 28, 2005

(65) Prior Publication Data

US 2005/0147113 A1 Jul. 7, 2005

Related U.S. Application Data

(63) Continuation of application No. 10/187,472, filed on Jun. 28, 2002, now Pat. No. 6,862,287, which is a continuation-in-part of application No. 09/409,184, filed on Sep. 30, 1999, now Pat. No. 6,775,281.

(51) Int. Cl.
*H04L 12/28* (2006.01)

(52) U.S. Cl. ........ 370/389; 370/392; 370/401; 711/168; 711/216

(58) Field of Classification Search .................. None
See application file for complete search history.

(56) References Cited

U.S. PATENT DOCUMENTS

| | | | |
|---|---|---|---|
| 5,032,987 A | 7/1991 | Broder et al. | |
| 5,129,074 A | 7/1992 | Kikuchi et al. | |
| 5,371,499 A | 12/1994 | Graybill et al. | |
| 5,473,607 A | 12/1995 | Hausman et al. | |
| 5,802,054 A | 9/1998 | Bellenger | |
| 5,914,938 A | 6/1999 | Brady et al. | |
| 5,949,786 A | 9/1999 | Bellanger | |
| 6,034,958 A | 3/2000 | Wicklund | |
| 6,091,725 A | 7/2000 | Cheriton et al. | |
| 6,430,184 B1 | 8/2002 | Robins et al. | |
| 6,690,667 B1 | 2/2004 | Warren | |
| 6,775,281 B1 * | 8/2004 | Brown | 370/392 |
| 6,862,287 B2 * | 3/2005 | Brown | 370/401 |
| 6,865,577 B1 * | 3/2005 | Sereda | 707/100 |
| 2002/0059197 A1 * | 5/2002 | Hunter et al. | 707/3 |

FOREIGN PATENT DOCUMENTS

EP 365 337 A2 4/1990

* cited by examiner

*Primary Examiner* — Duc C Ho

(57) ABSTRACT

A number of hash tables are accessed concurrently with a different computed index based on a single search key for each hash table. Each index identifies a location in one of the hash tables capable of storing at least one entry. If all indexed locations are used, the entries stored in the lookup table can be reordered so that the new entry can be inserted in one of the locations identified by the computed indexes.

27 Claims, 14 Drawing Sheets

METHOD AND APPARATUS FOR A FOUR-WAY HASH TABLE

RELATED APPLICATIONS

This application is a continuation of U.S. application Ser. No. 10/187,472, filed Jun. 28, 2002, now U.S. Pat. No. 6,862, 287 which is a continuation-in-part of U.S. application Ser. No. 09/409,184, filed Sep. 30, 1999 now U.S. Pat. No. 6,775, 281. The entire teachings of the above applications are incorporated herein by reference.

BACKGROUND OF THE INVENTION

In a computer network, a networking switch receives data packets from a number of ingress ports connected to the switch and forwards the data packets to a number of egress ports connected to the switch. The switch determines the egress port to which the data packets are forwarded dependent on a destination address included in the data packet received at one of the ingress ports.

The egress ports to which data packets are to be forwarded based on a destination address are stored in a forwarding entry in a forwarding table in the networking switch. The forwarding table is searched for the forwarding entry associated with a particular destination address.

In general, it is not feasible to provide an entry in the forwarding table for each possible destination address accessible through the switch. For example, for a 48 bit Ethernet destination address, that is, a Media Access Control ("MAC") address, $2^{48}$ forwarding entries are required in the forwarding table to store forwarding information for all the possible MAC addresses. Instead, only a portion of the MAC addresses are stored in a hash table. A hash function is performed on the destination address to provide a smaller number which is then used to index the hash table.

As a result of performing a hash function on the destination address, multiple destination addresses may map to the same index, that is, aliasing may occur. Thus, an insert of an entry into a location in the hash table may be blocked if the location is already storing a forwarding entry for another destination.

One approach to the problem of aliasing is to generate a second hash function for the destination address in order to provide a second index if the forwarding entry is not found at the first index. However, multiple levels of hashing results in a non-deterministic search by adding delay to the search for the forwarding entry.

One well-known technique for reducing aliasing and providing a deterministic search is to provide more than one location at each index. This is also called the multiple bucket technique. In a hash table implementing multiple buckets, a predetermined number of locations or buckets are provided at each index.

FIG. 1A illustrates a block diagram of a prior art multi-bucket hash table 136. The hash table 136 includes $2^{15}$ indices (through index bits 14:0) 134. There are four buckets 138A-D at each index 134. Each of the buckets 138A-D stores one forwarding entry. The size of the hash table 136 is determined by the size of the location 138A-D and the total number of indices 134. For example, if each bucket 138A-D is one byte wide, a 128 Kilobytes (32 Kilobytes×4) hash table is required.

However, the multi-bucket hash table results in inefficient use of memory and an insert of a forwarding entry may be blocked if all the locations at an index are used. Thus, no further forwarding entries for destination addresses mapping to the index can be stored at that index in the hash table even though unused locations may be available at other indices in the hash table.

SUMMARY OF THE INVENTION

A network switch includes a plurality of hash tables, each of which is accessed concurrently with a different computed index. The indices are computed by hash function logic from a key. The number of possible keys is greater than the number of locations in the plurality of hash tables. Each of the locations identified for the key includes at least one bucket for storing an entry for the key. A forwarding entry for a key is inserted in one of the locations identified by the computed indices for the key. When a packet is received, the indices are computed to access the plurality of hash tables, and the located entries are searched for one having a matching key. By appropriate storage of forwarding entries during the insert process, the match search can be completed in one search cycle.

The entry is preferably inserted in an unused location identified by the computed indices by insert logic after detecting the unused location. Having determined that all the locations identified by the computed indices for the key are used, the insert logic moves one of the entries having another key to another location available to the other key and then inserts the new forwarding entry in an empty bucket in a location identified by one of the computed indices. Since the movement of that entry may result in movement of yet another entry, the forwarding entries may be recursively reordered.

When a packet is received, a key match logic searches the hash tables for a search key stored in a bucket in one of the locations specified by the computed indices and provides the matching entry. Because of the reordering in the insert process, the proper forwarding entry in one of the indexed locations can be assured.

The hash function logic preferably computes the index for each hash table by generating a CRC for the key and selecting a portion of the CRC as the index.

In one embodiment, the number of hash tables is two and the number of buckets at each indexed location is two. In an alternate embodiment, the number of hash tables is four and the number of buckets at each indexed location is one.

Each index is shared by a different set of keys. The key may include a Media Access Control Address.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 10 illustrates sharing of indexed locations in the hash tables shown in FIG. 9 by a plurality of keys; and.

DETAILED DESCRIPTION OF THE INVENTION

A description of preferred embodiments of the invention follows.

Figure 1A:
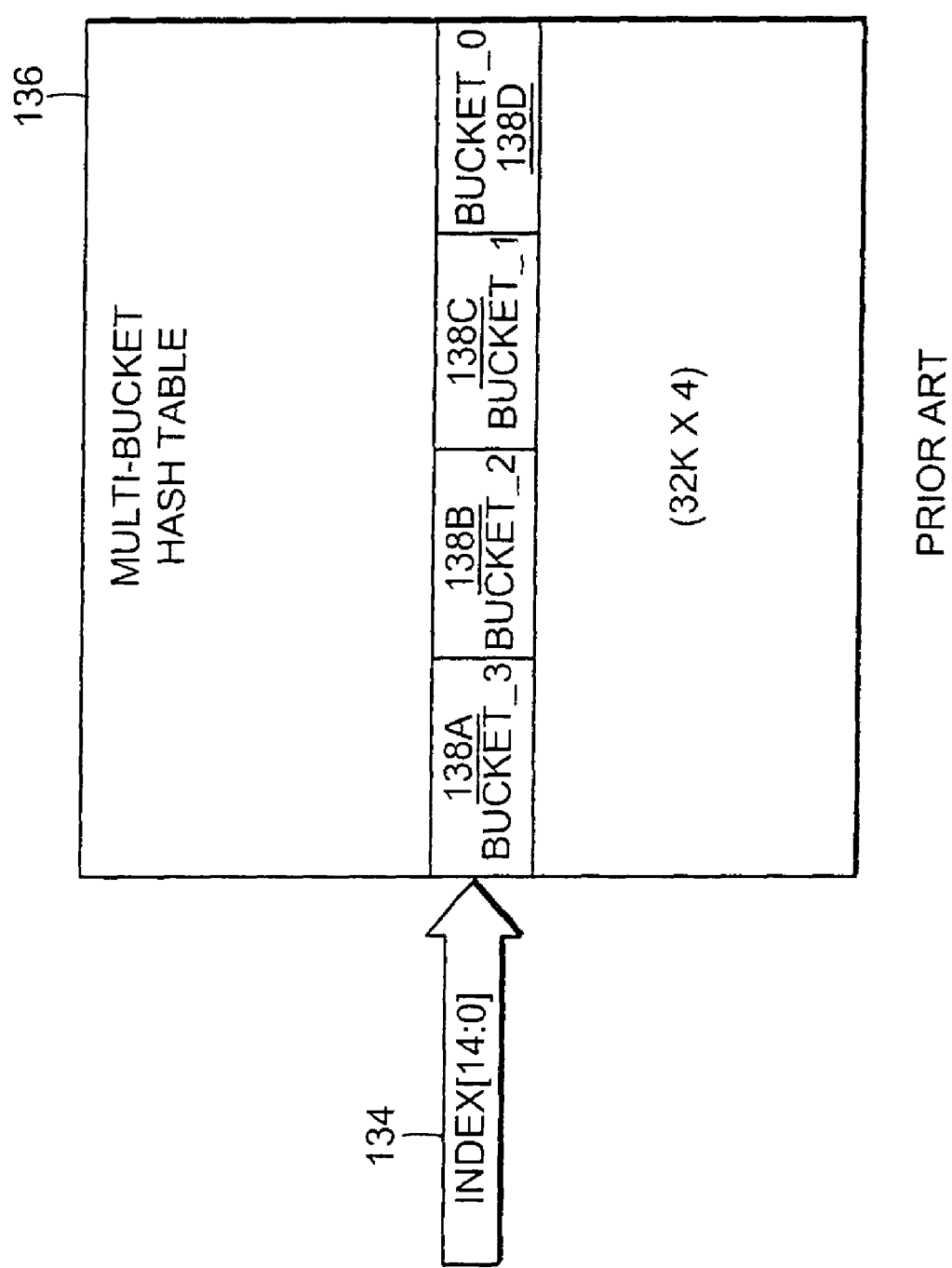
FIG. 1A is a block diagram of a prior art multi-bucket hash table for providing forwarding entries.
Figure 1B:
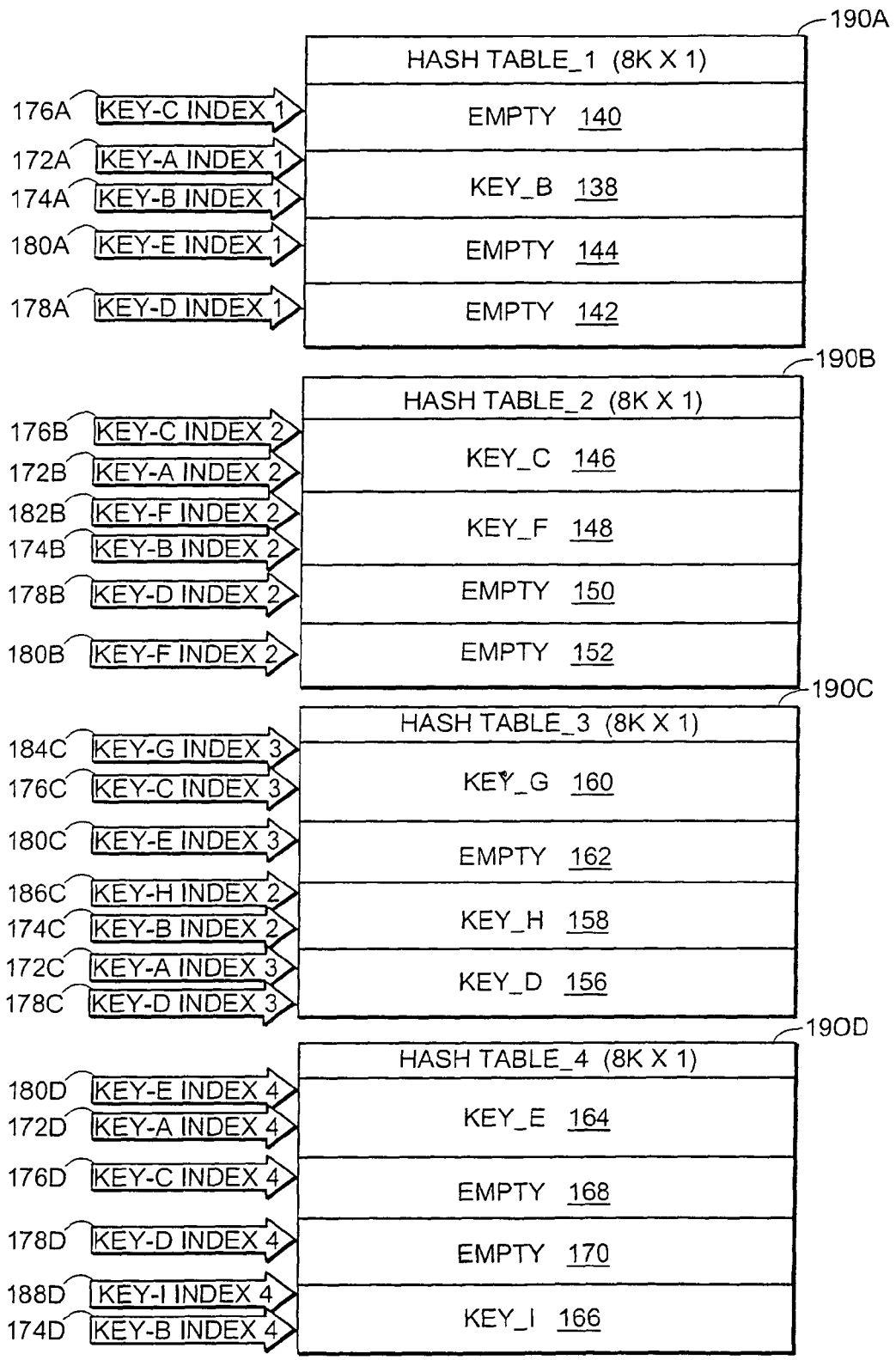
FIG. 1B is a block diagram illustrating hash tables for providing forwarding entries according to the principles of the present invention.

FIG. 1B is a block diagram illustrating hash tables 190A-D in a network switch for storing forwarding entries according to the principles of the present invention. Each of the hash tables 190A-D provides only $2^{13}$ indices, with one location at each index for storing a forwarding entry. The combined hash tables 190A-D have $12^{15}$ ($2^{13} \times 2^2$) indices. Thus, the four hash tables 190A-D provide the same number of indices as the prior art multi-bucket hash table shown in FIG. 1A, in a hash table that is one fourth the size of prior art multi-bucket hash table. The number of locations at each index and the number of bits per location is a design choice and not a limitation of the invention.

Four different indices are computed concurrently by hash function logic dependent on a destination address. The hash function logic is described further with reference to FIG. 3. Each of the computed indices is provided to a different hash table 190A-D. For example, four different indices are generated dependent on Key_A, that is, Key_A index 1-4 172A-D. A forwarding entry for a key is inserted in one of the locations identified by one of the four computed indices so that on a subsequent search for the key, the key is located in one search cycle.

For example, in order to provide a forwarding entry for Key_A in one search cycle, Key_A must be stored in one of the locations 138, 146, 156 164 identified by Key_A Index 1-4 176A-D. If all of the locations 138, 146, 156, 164 are storing forwarding entries for other insert keys, one of the forwarding entries is moved to another location in one of the hash tables 190A-D in order to provide one of the locations 138, 146, 156, 164 for storing Key_A. A method for reordering the forwarding entries stored in the hash tables 190A-D is described in conjunction with FIG. 8.

As shown, the four Key_A indices 172A-D identify location 138 in hash table_1 190A, location 146 in hash table_2 190B, location 156 in hash table_3 190C and location 164 in hash table_4 190D. All the locations 138, 146, 156, 164 are storing forwarding entries for keys other than Key_A. Key_B is stored in location 138, Key_C is stored in location 146, Key_D is stored in location 156 and Key_E is stored in location 164. Unused or empty locations are available in the hash tables; for example, locations 140, 142, 144 are unused in hash table 1 190A.

In order to provide a deterministic search, that is, switching without queuing Key_A must be stored in one of the locations identified by the indices for Key_A 172A-D. Thus, one of the keys stored in locations 138, 146, 156, 164 must be moved to an unused location, so that a forwarding entry for Key_A can be stored in the emptied location, and the forwarding entry for the key that is moved is stored in a location identified by one of the moved key's other indices.

Key A shares location 138 with Key B. An entry for Key B stored at location 138 can therefore be moved to an empty location identified by any of the other indices for Key_B 174B-D. As shown, the other locations 148, 158, 166 identified by the other indices for Key_B 174B-D are used; therefore, Key_B can not be moved to one of the other locations 148, 158, 166. However, two of the locations 140, 168 identified by two of the other indices for Key_C 176A, 176D are empty. Thus, the forwarding entry for Key_C may be moved from location 146 to location 168 or 140. After moving the forwarding entry for Key_C, the forwarding entry for Key_A is inserted into location 146 identified by key_A index_2 172B. A search for the forwarding entry for Key_A or Key_C is deterministic, that is, each of the searches can be completed in one search cycle. Similarly, forwarding entries for Key_D could have been moved from location 156 to location 142, 150 or 170 to provide location 156 for inserting Key_A, or, Key_E could have been moved from location 164 to location 144, 152 or 162 to provide location 164 for inserting Key_A.

Thus, in order to provide a deterministic search for each forwarding entry stored in the hash tables 190A-D, the forwarding entries stored in the hash tables 190A-D are reordered so that a forwarding entry for a destination address is stored at one of the computed indices for the destination address.

A comparison of the approach of the present invention to the prior art approach presented in FIG. 1A is facilitated by considering the expansion of the individual index locations of FIG. 1B to include four buckets each, as illustrated in FIG. 1A. Such a configuration uses the same 32K×4 memory as FIG. 1A. Each index into the hash table similarly offers four forwarding entries which might be a proper match to the destination address, but there are four indices into the hash table for each key as opposed to the single index of FIG. 1A.

With the present invention, there is a greater sharing of each index with other destination addresses. When inserting forwarding entries in the FIG. 1B approach, conflict at any one index is more likely because of the greater sharing, but overall the FIG. 1B approach with multiple indices per key and multiple buckets provides no more initial conflict in the insertion process. Advantageously, the present approach additionally offers the possibility of shifting otherwise blocking forwarding entries to other locations which are not shared with a particular key, thus offering greater flexibility in the insertion process. Any keys which might be in conflict at a particular index will not likely be in conflict at any other index to which a forwarding entry might be moved. This advantage is obtained regardless of whether multiple buckets are used, and the single bucket approach of FIG. 1B accomplishes this with a reduction in the memory area required by a factor of four.

Although the insertion process may require additional processing time for the relocation proportional to the level of recursion which is implementation dependent, time required to process an insertion is much less critical than the need to find a match in a single cycle during the routing process. With the present invention, such a match is substantially more probable. In fact, a match is almost certain within the bounds of total memory size.

Figure 1C:
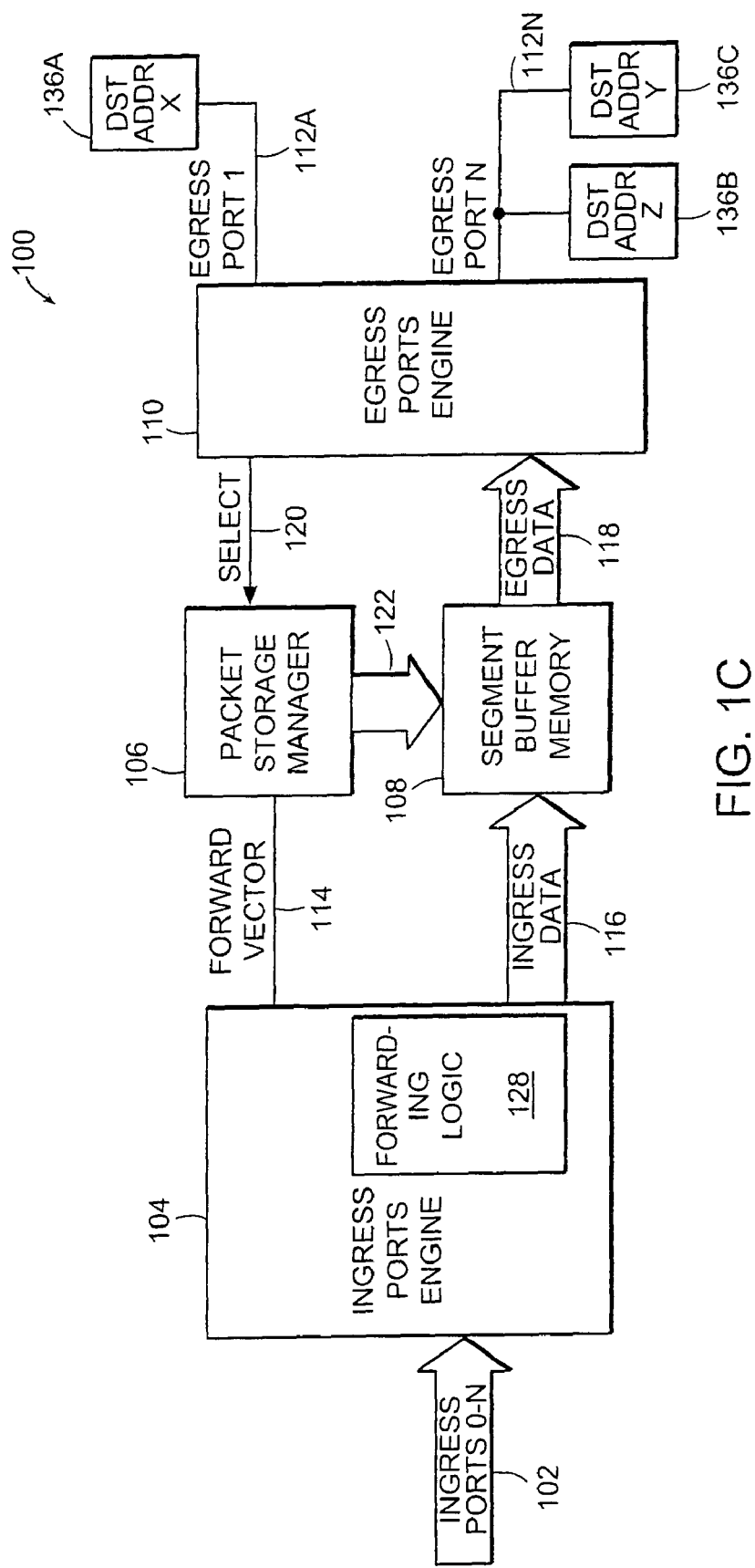
FIG. 1C is a block diagram of a non-blocking common memory switch in which the hash tables of FIG. 1B can be used.

FIG. 1C is a block diagram of a common memory switch 100 in which the hash tables shown in FIG. 1B may be used. All data received on ingress ports 102 is stored in segment buffer memory 108 before being switched to one or more egress ports 112. The packet storage manager 106 controls write and read access to the segment buffer memory 108.

The switch 100 includes an ingress ports engine 104 and an egress ports engine 110. A data packet is received serially at an ingress port 102. The ingress ports engine 104 detects and processes headers in the received data packet and selects a forward vector 114 stored in a forward entry for the data packet in the forwarding logic 128 in the ingress port engine 104. The forward vector 114 is a bit map, with a bit corresponding to each of the plurality of egress ports 112, indicating whether the data packet is to be forwarded to that egress port 112 dependent on the destination address in the header. The forward vector 114 is forwarded to the packet storage manager 106. For example, data packets with destination address X are forwarded through egress port_1 112A to the network node with destination address 136A, data packets with destination address Y are forwarded through egress port_N 112N to the network node with destination address Y 136C and data packets with destination address Z are forwarded through egress port_N 112N to the network node with destination address Z 136B.

The packet storage manager 106 provides access to the segment buffer memory 108. The packet storage manager 106 provides segment buffer memory addresses 122 for read and write operations to the segment buffer 108 and stores in the manager 106 the locations in the segment buffer memory 108 of each data packet stored. The egress engine 110 selects one of the plurality of egress ports 112, through select control signals 120, on which to transmit a data packet and provides the stored data packet to the selected egress port 112.

The segment buffer memory 108 is a common memory shared by all ingress ports 102 and egress ports 112. The switch 100 is non-blocking, that is, a data packet arriving at any of the ingress ports 102 is not blocked from being forwarded to any of the egress ports 112 as described in co-pending U.S. application Ser. No. 09/386,589 filed on Aug. 31, 1999 entitled "Method and Apparatus for an Interleaved Non-Blocking Packet Buffer" by David A. Brown, the entire teachings of which are incorporated herein by reference. The switch 100 provides concurrent processing by the ingress ports engine 104 of data packets received at ingress ports 102 and processing of stored data packets by the egress port engine 110 for egress ports 112.

Figure 1D:
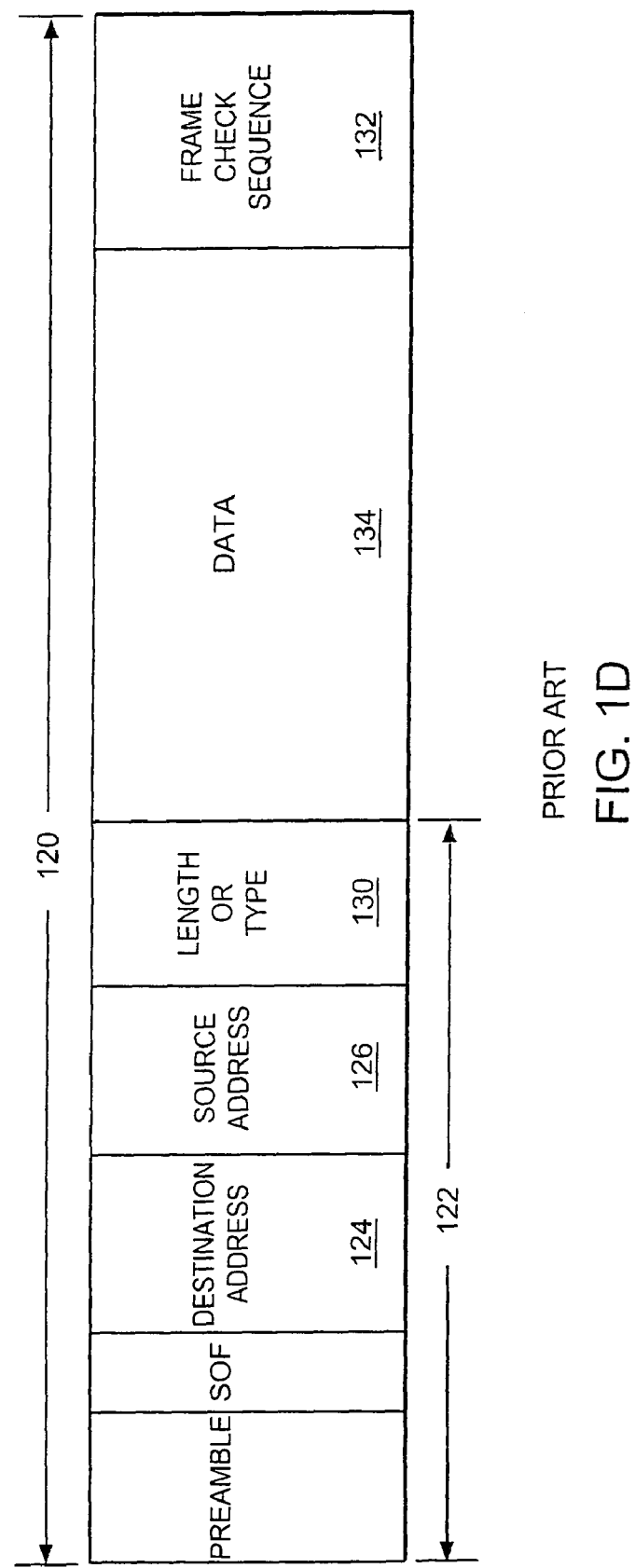
FIG. 1D is a block diagram of a prior art Ethernet data packet which may be received at an ingress port.

FIG. 1D is a block diagram illustrating a prior art Ethernet data packet 120 which may be received at an ingress port 102. The Ethernet data packet includes a header 122, data field 134, and a frame check sequence 132. The header 122 includes a destination address 124, a source address 126, and a length or type field 130. The source address 126 and the destination address 124 are unique 48 bit addresses identifying the physical device at the source and the destination respectively. The data packet may also include a 12 bit VLAN Identifier ("VID") (not shown). The size of the data packet 120 is dependent on the size of data field 134, which can vary from 46 bytes to 1,500 bytes.

Figure 2:
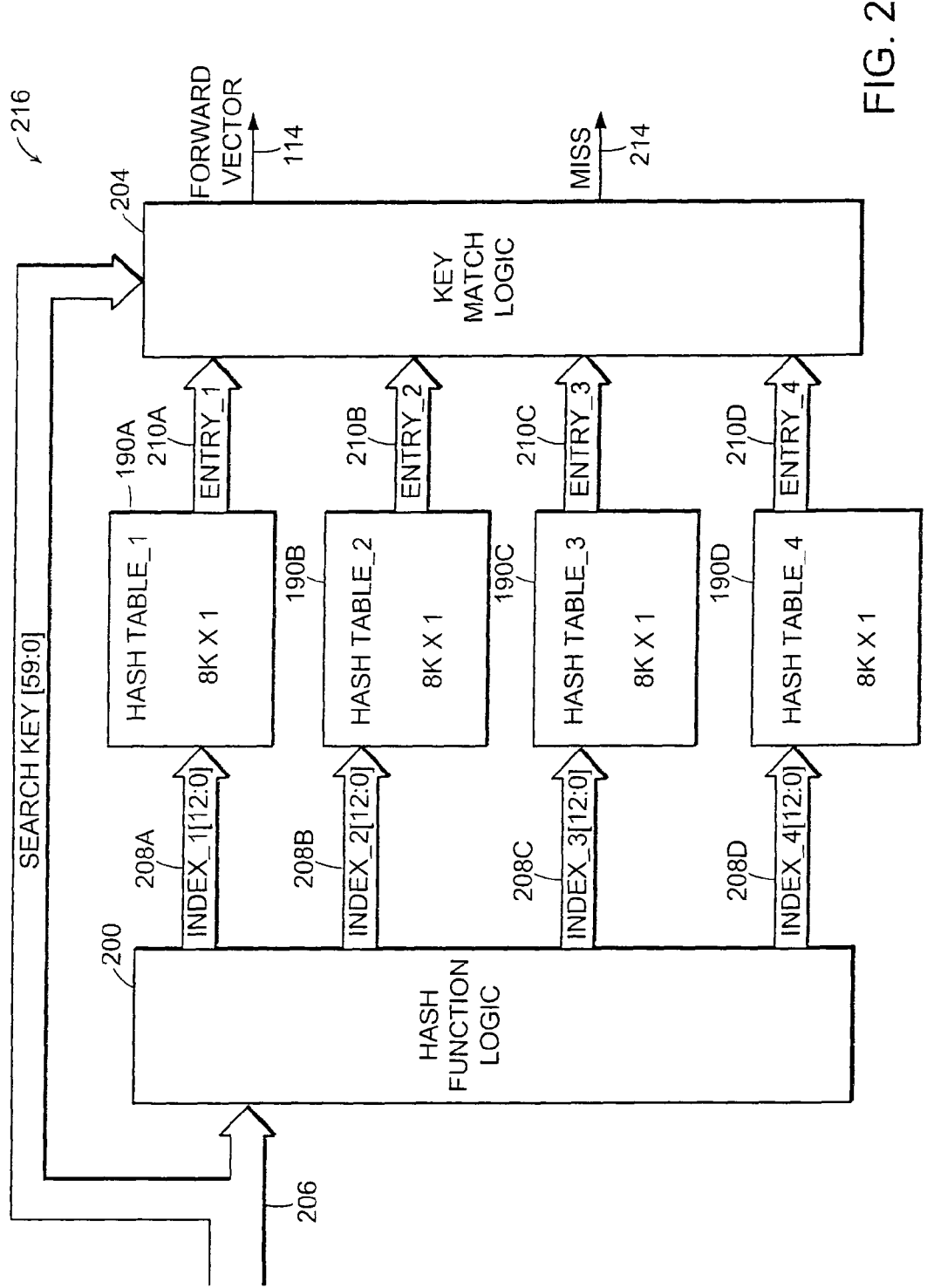
FIG. 2 is a block diagram illustrating the search logic including the hash tables in the forwarding logic shown in the non-blocking common memory switch in FIG. 1C.

FIG. 2 is a block diagram of the search logic 216 in the forwarding logic 128 shown in the ingress ports engine 104 in the non-blocking common memory switch 100 in FIG. 1C according to the principles of the present invention. The search logic 216 includes four hash tables 190A-D. The number of hash tables 190A-D is a design choice and not a limitation of the invention.

The search logic 216 also includes a hash function logic 200 and a key match logic 204. The hash function logic 200 concurrently generates four indices 208A-D dependent on a search key 206. The search key 206 is similar to a tag in cache memory. The key match logic 204 determines which of the four locations identified by the indices 208A-D stores a forwarding entry associated with the search key 206. Upon finding a matching forwarding entry, the forward vector 114 portion of the matching forwarding entry is forwarded to the packet storage manager 106 (FIG. 1C).

To search for the forwarding entry corresponding to a destination address in the header of a data packet, the ingress ports engine 104 examines the header 122 (FIG. 1D) of the data packet 120 as the data packet is being received from one of the ingress ports 102 (FIG. 1C). A copy of the 48 bit destination address 124 (FIG. 1D) is concatenated with a 12 bit VLAN IDentifier ("VDI") to form a 60-bit search key 206. The concatenation of the destination address and the VDI is a design choice and not a limitation of the invention, thus, the search key may be the destination address 124 (FIG. 1D). The search key 206 is forwarded to the hash function logic 200. The hash function logic 200 provides four thirteen bit indices 208A-D as a result of performing a hash function on the search key 206.

The invention is described for an Ethernet data packet 120 as shown in FIG. 1D. However, the invention is not limited to Ethernet data packets, it may be used to insert and search for forwarding entries for any other type of data packet.

Figure 3:
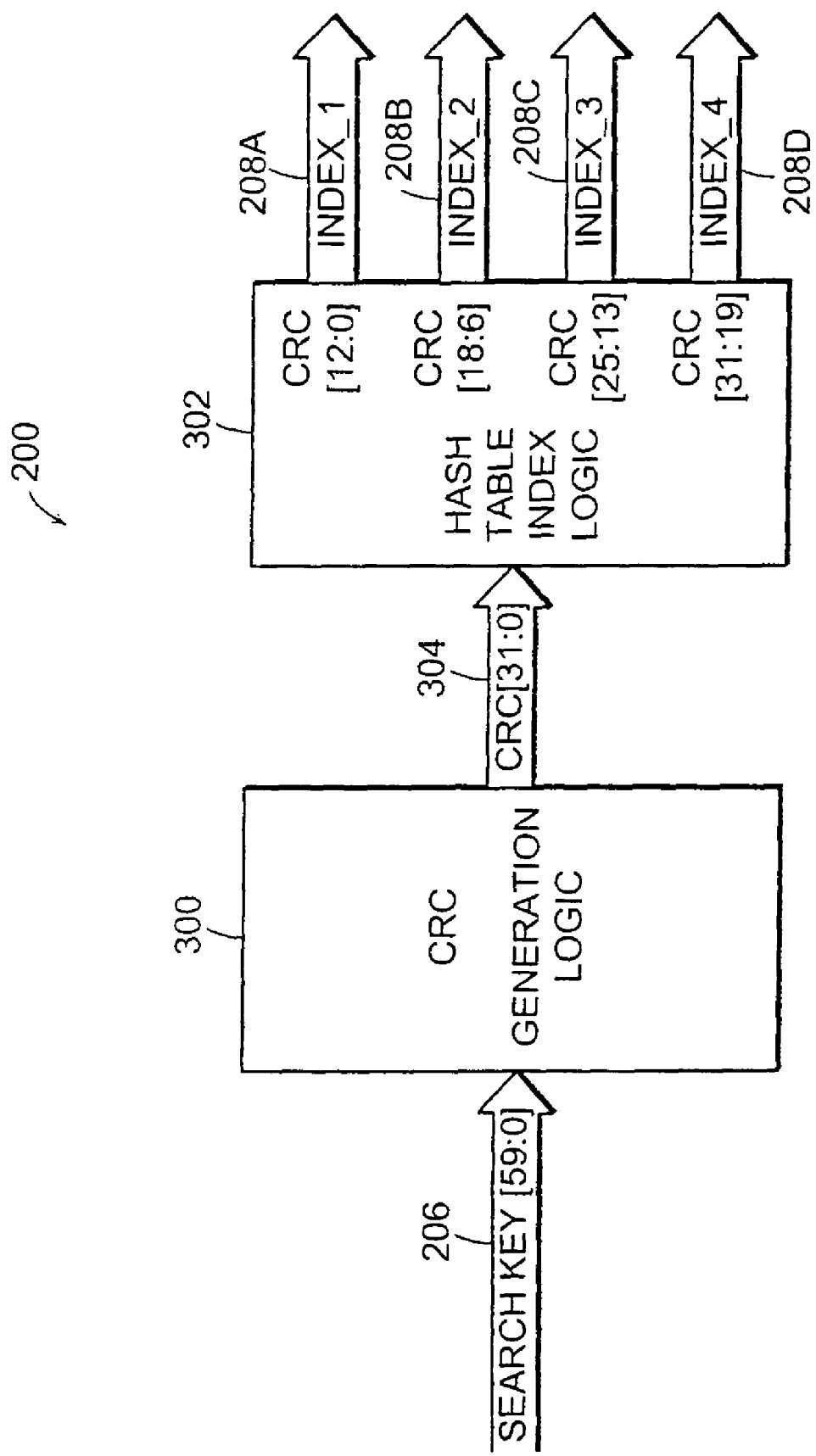
FIG. 3 is a block diagram illustrating hash function logic shown in FIG. 2.

FIG. 3 is a block diagram illustrating the hash function logic 200 shown in FIG. 2. The hash function logic 200 includes a Cyclic Redundancy Check ("CRC") generation logic 300 and a hash table index logic 302. The hash function is a CRC function which is performed on the search key 206 in the CRC generation logic 300. CRC generation logic is well known to those skilled in the art. The hash function is not limited to CRC generation, the hash function used may be any hash function used by those skilled in the art. The CRC generation logic 300 generates a 32 bit CRC 304 from the 60 bit search key 206.

The 32 bit CRC 304 is forwarded to the hash table index logic 302. The hash table index logic 302 generates four indices 208A-D from the 32 bit CRC 304. Each of the four indices 208A-D has 13 bits and thus provides 8K addresses to address the 8K locations in each of the hash tables 190A-D. The four indices 208A-D are generated by mapping bits of the 32 bit CRC 304 to the four indices 208A-D as follows: Bits 12:0 of the CRC 304 are mapped to Bits 12:0 of Index_1 208A; Bits 18:6 of the CRC 304 are mapped to Bits 12:0 of Index_2 208B; Bits 25:13 of the CRC 304 are mapped to Bits 12:0 of Index_3 208C and Bits 31:19 of the CRC 304 are mapped to Bits 12:0 of Index-4 208D.

Returning to FIG. 2, after the indices 208A-D have been generated by the hash function logic 200, the entries 210A-D stored at the locations in the hash tables 190A-D specified by the indices 208A-D are forwarded to the key match logic 204. The search key 206 is also forwarded to the key match logic 204.

Figure 4:
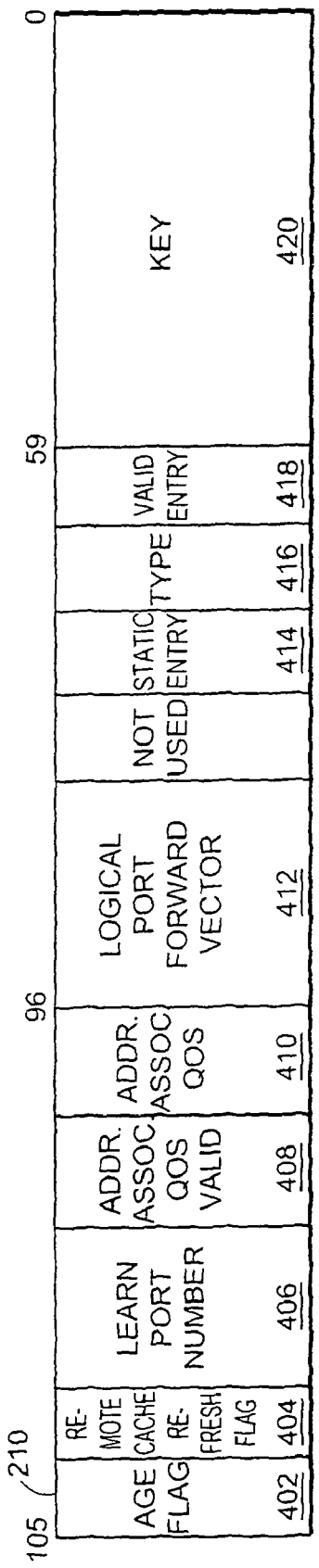
FIG. 4 is a block diagram illustrating the format of a forwarding entry stored in any one of the hash tables shown in FIG. 1B.

FIG. 4 is a block diagram showing the format of a forwarding entry 210 stored in any one of the locations in hash tables 190A-D shown in FIG. 2. The forwarding entry 210 includes fields indicating where a data packet is to be forwarded. The forwarding entry 210 includes the following fields: an age flag 402, a remote cache refresh flag 404, a learn port number 406, address associated QoS valid 408, an address associated QoS 410, a logical port forward vector 412, a static entry indicator flag 414, a type flag 416, a valid entry indicator flag 418 and a key 420.

The one bit age flag 402 indicates the age of the forwarding entry 210. The one bit remote cache refresh flag 404 indicates if timeouts are enabled. The learn port number 406 indicates on which interface the MAC address stored in the key 420 in the forwarding entry was learned. For example, if the MAC address was learned on a local external access port, this is the physical ingress port number 104. The address associated Quality of Service ("QoS") field 410 indicates a management assigned quality of service for the address. The one bit address QoS associated valid 408 flag indicates whether the QoS field 410 is to be used for future queuing consideration. The 32 bit logical port forward vector 412 indicates to which ports the data packet is to be forwarded. The one bit static entry indicator flag 414 indicates whether the forwarding entry 210 is static or dynamic. The one bit type flag 416 indicates whether the forwarding entry 210 can be used for a level 2 forwarding entry. The one bit valid entry indicator flag 418 indicates whether the forwarding entry 210 is valid. The 60 bit key 420 stores the search key 206 associated with the forwarding entry 210.

Returning to FIG. 2, the key match logic 204 compares the key entry 420 stored in each of the forwarding entries 210A-D forwarded from the hash tables 190A-D with the search key 206. If there is a match, the 32 bit logical port forward vector 412 (FIG. 4) from that forwarding entry is forwarded on the forward vector 114 to the packet storage manager 106 (FIG. 1). If there is no match a miss signal 214 is generated and the miss is processed by the no match found logic (not shown) in the ingress ports engine 104.

Figure 5:
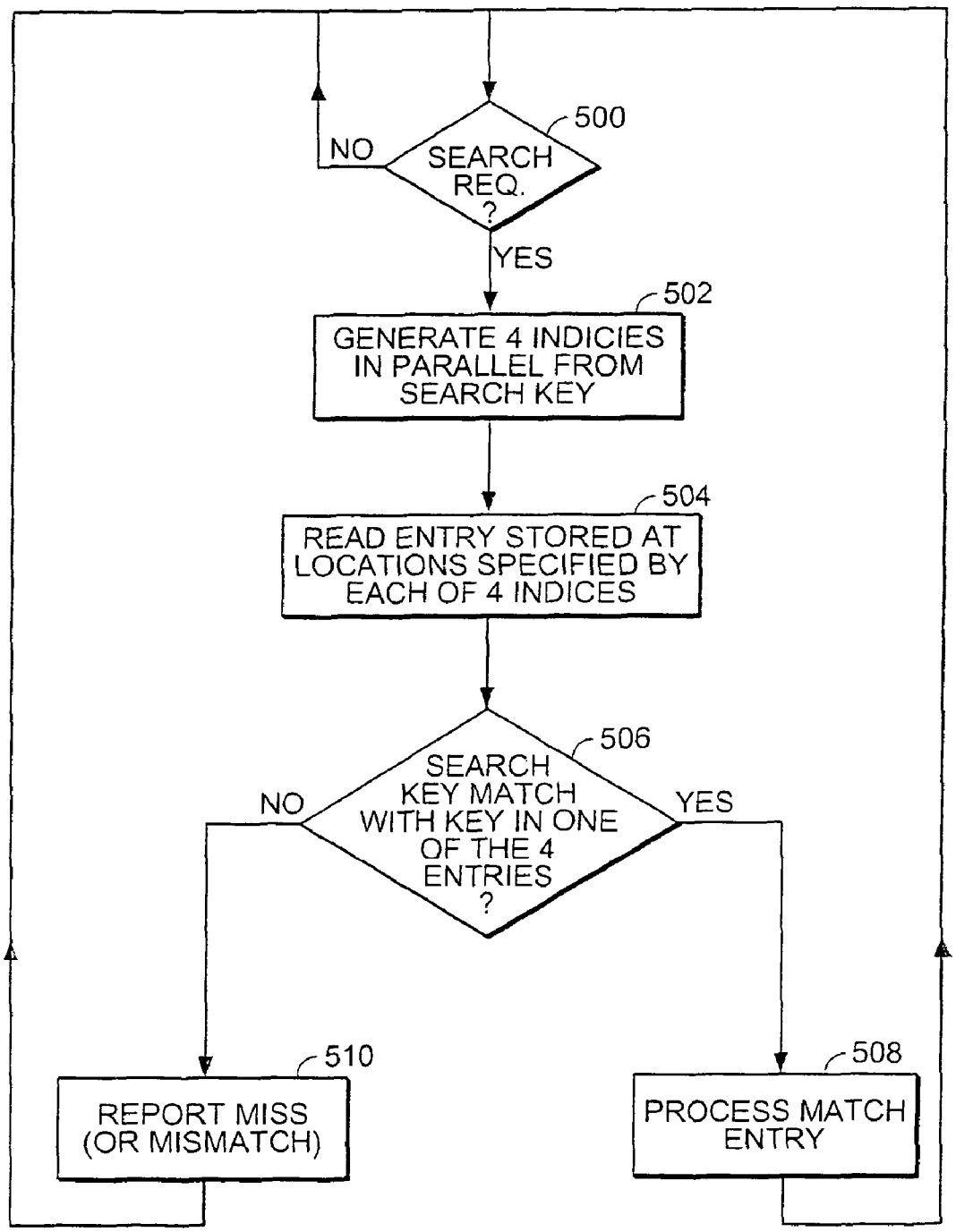
FIG. 5 is a flow graph illustrating the steps in the search logic for searching for a forwarding entry matching a search key in one of the hash tables.

FIG. 5 is a flow graph illustrating the steps in the search logic 216 for searching for a forwarding entry 210 matching a search key 206 in one of the hash tables 190A-D.

At step 500, the search logic 216 waits for a search request. If there is a search request processing continues with step 502. If not, the search logic 216 continues to wait for a search request.

At step 502, the hash function logic 200 generates four indices 208A-D from the search key 206 and forwards the four indices 208A-D to the hash tables 190A-D. Processing continues with step 504.

At step 504, the forwarding entries 210A-D stored at the locations in the hash tables 210A-D specified by the indices 208A-D are forwarded to the key match logic 204. Processing continues with step 506.

At step 506, the key match logic 204 compares the key 420 (FIG. 4) stored in each of the forwarding entries 210A-D with the search key 206 and determines if there is a match. If there is a match processing continues with step 508. If not, processing continues with step 510.

At step 508, the forwarding entry 210A-D for the search key 206 has been found. The logical port forward vector 412 (FIG. 4) stored in the forwarding entry 210 is forwarded on the forward vector 114 (FIG. 1C) to the packet storage manager 106 (FIG. 1C). The data packet is forwarded to the predetermined egress ports 112 through the packet storage manager 106, segment buffer memory 108 and the egress ports engine 110. Processing continues with step 500.

At step 510, a forwarding entry 210A-D matching the search key 206 has not been found. The ingress ports engine 104 processes the miss for example, by flooding, that is, sending the data packet to all of the egress ports 112. This process is part of the bridging protocol. Processing continues with step 500.

Figure 6:
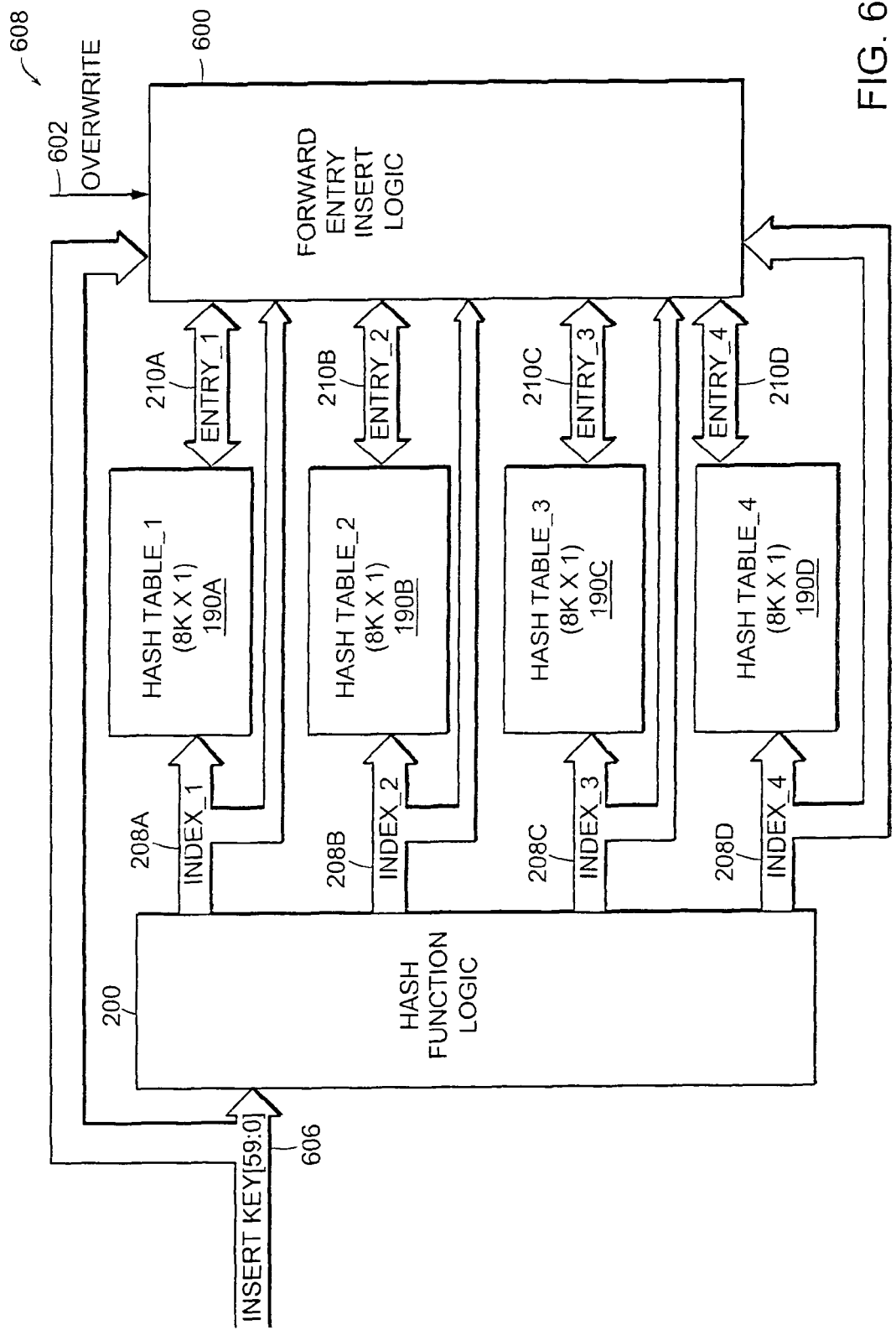
FIG. 6 is a block diagram illustrating the insert logic for inserting a new entry in one of the hash tables.

FIG. 6 is a block diagram illustrating the insert logic 608 in the forwarding logic 128 (FIG. 1C) for inserting a forwarding entry 210 in a location in one of the hash tables 190A-D. A copy of the 48 bit destination address 124 (FIG. 1D) is concatenated with a 12 bit VLAN IDentifier ("VID") to form a 60-bit insert key 606. The concatenation of the destination address and the VID is a design choice and not a limitation of the invention. The same hash function is performed on the insert key 606 as is performed on the search key 206. The hash function has already been described for the search key 206 in conjunction with FIG. 3. Four indices 208A-D are generated as a result of the hash function. Each of the indices identifies the location in a respective hash table 190A-D at which the insert key 606 may be inserted.

The contents of the forwarding entries 210A-D stored at the locations in the hash tables 190A-D identified by the indices 208A-D are forwarded to the insert logic 600. The forward entry insert logic 600 determines at which locations identified by the indices 208A-D to insert the insert key 606 dependent on the contents of the forwarding entries 210A-D and the state of the overwrite signal 602.

The forward entry insert logic 600 determines which of the locations identified by indices 208A-D are unused. If an unused location is found, a forwarding entry 210 including the insert key 606 is inserted in the unused location identified by the index 208 to the unused location. If no unused location is found and the overwrite signal 602 indicates that overwrite is enabled, one of the indices 208A-D is randomly selected and a forwarding entry including the insert key 606 is inserted in the location identified by the selected index 208.

If all the locations are used and the overwrite signal 602 indicates that overwrite is not enabled, a reordering of forwarding entries stored in the hash tables 190A-D is performed in order to provide an unused location identified by the indices 208A-D to insert a forwarding entry including the insert key 606. A method for reordering forwarding entries 210A-D in the hash tables 190A-D is described in conjunction with FIG. 8.

Figure 7:
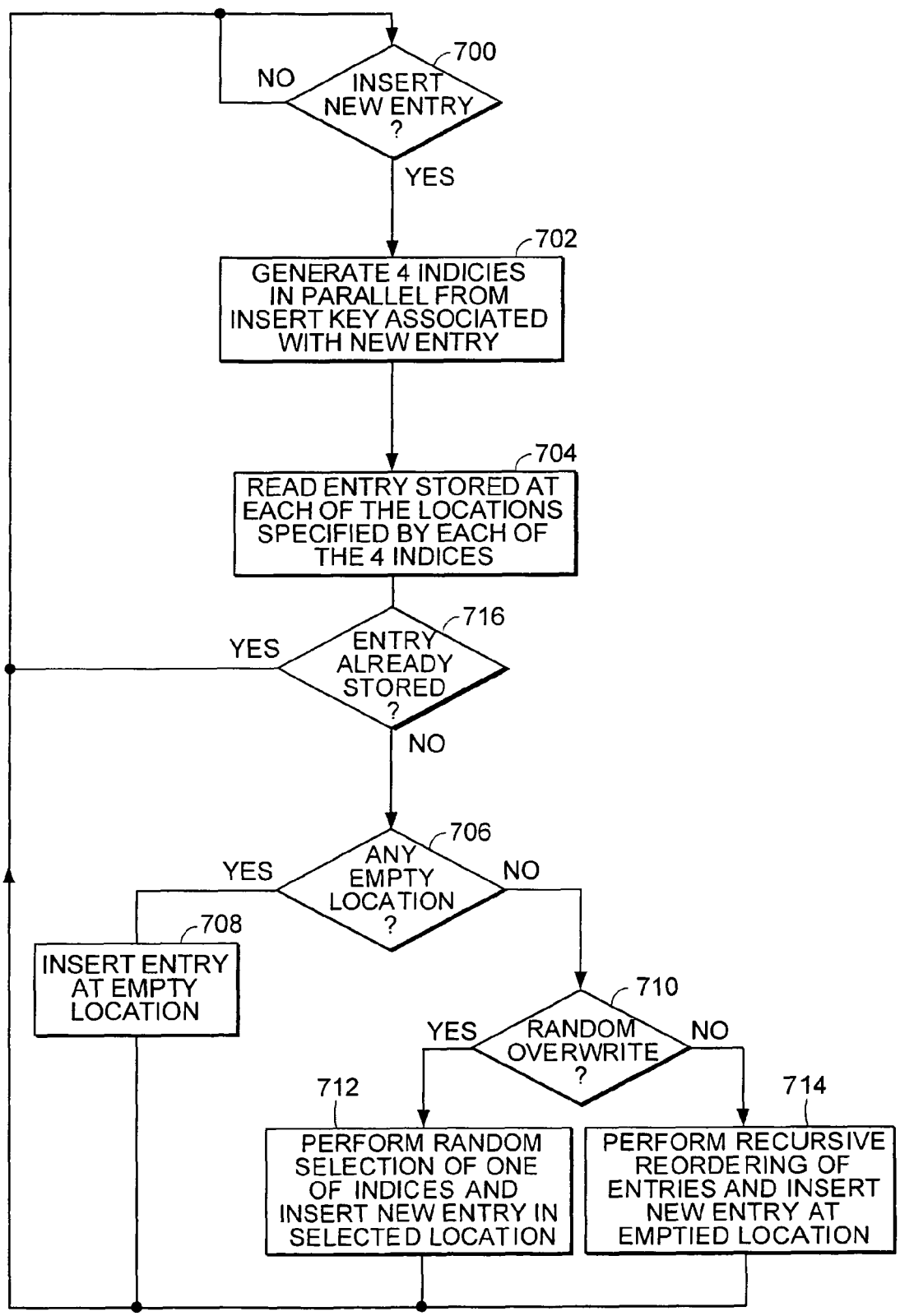
FIG. 7 is a flow chart illustrating the steps in the insert logic shown in FIG. 6 for inserting a forwarding entry into one of the hash tables by overwriting a used entry.

FIG. 7 is a flow chart illustrating the steps in the insert logic 608 shown in FIG. 6 for inserting a forward entry 210 including an insert key 606 in a location in one of the hash tables 190A-D.

At step 700, the hash function logic 200 receives a request to insert a forwarding entry in a location in one of the hashing tables 190A-D. Processing continues with step 702.

At step 702, the hash function logic 200 concurrently generates four indices 208A-D in parallel from the insert key 606. The generation of the indices 208A-D has already been described in conjunction with FIG. 3. Processing continues with step 704.

At step 704, the contents of the locations in the hash tables 190A-D identified by the generated indices 208A-D are forwarded to the forward entry insert logic 600. Processing continues with step 706.

At step 716, if the insert key 606 is already stored in a location identified by the generated indices 208A-D, processing continues with step 700 to wait for another request to insert a forwarding entry. If the insert key 606 is not already stored, processing continues with step 706 to select one of the indexed locations to store the insert key.

At step 706, the forward entry insert logic 600 (FIG. 6) determines from the forwarded contents whether the locations are unused. For example, by examining the valid entry field 418 (FIG. 4) in the forwarding entry 210. If one of the locations is unused, processing continues with step 708. If all the locations identified by the generated indices 208A-D are used, processing continues with step 710.

At step 708, the forward entry insert logic 600 (FIG. 6) inserts a forwarding entry 210 including the insert key 606 in a location identified by one of the generated indices 190A-D identifying an unused location.

At step 710, the forward entry insert logic 600 (FIG. 6) determines if overwrite is enabled dependent on the state of the overwrite signal 602 (FIG. 6). Overwrite is set if a single cycle insert is required and the forwarding entries in the hash tables are continually updated for example, if the hash tables 190A-D are being used in an Ethernet bridge. If overwrite is enabled, processing continues with step 712. If overwrite is not enabled, processing continues with step 714.

At step 712, the forward entry insert logic 600 (FIG. 6) selects an used location identified by any one of the generated indices 208A-D in which to overwrite a forwarding entry including the insert key 606.

At step 714, the forward entry insert logic 600 (FIG. 6) performs reordering of the forwarding entries 210A-D stored in locations identified by the generated indices 208A-D in order to move one of the forwarding entries to a location specified by another index in one of the hash tables 190A-D. A method for reordering is described in conjunction with FIG. 8. After the reordering is complete and an unused location is provided at one of the locations identified by the generated indices 208A-D, a forwarding entry 210 including the insert key 606 is inserted in the unused location.

Figure 8:
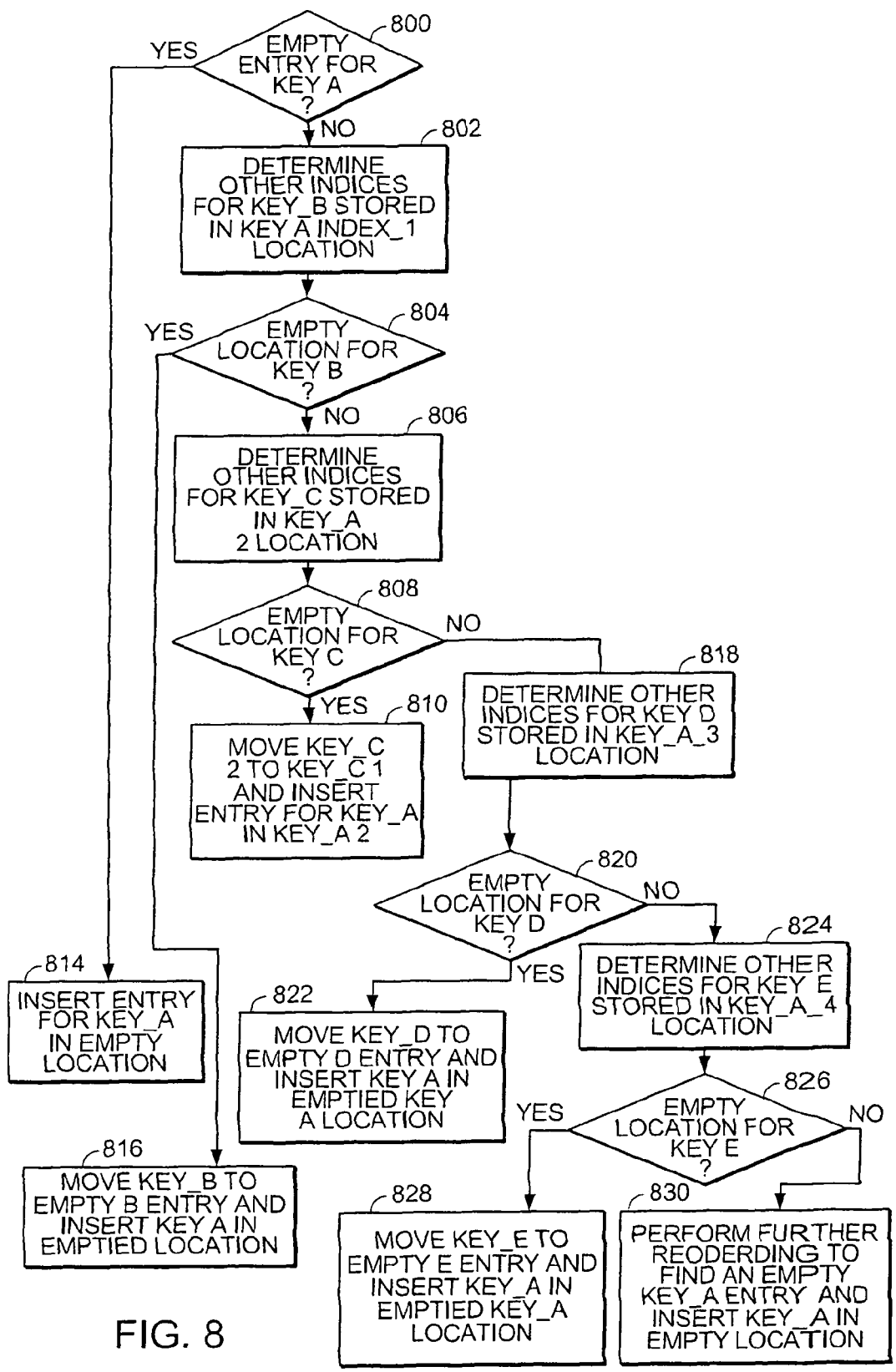
FIG. 8 is a flow chart illustrating the steps in the insert logic shown in FIG. 6 for recursively reordering the forwarding entries stored in the hash tables in order to free a location in the hash tables for inserting a forwarding entry.

FIG. 8 is a flow chart illustrating the steps in the forward entry insert logic 600 shown in FIG. 6 for reordering the forwarding entries in the hash tables 190A-D shown in FIG. 1B to insert Key_A in a location identified by the indices for Key_A 172A-D.

At step 800, having determined that Key_A is not stored at the locations identified by the indices for Key_A 172A-D, the forward entry insert logic 600 (FIG. 6) determines if any of the locations identified by the indices for Key_A 172A-D are unused. If there is an unused location, no reordering of the forwarding entries is required and processing continues with step 814. If all the locations are used, reordering is required to provide an unused location identified by one of the indices for Key_A 172A-D in which to store Key_A and processing continues with step 802.

At step 802, the forward entry insert logic 600 (FIG. 6) determines from Key_B stored in location 138 identified by Key_A index_1 172A and Key_B index_1 174A, the other indices for Key_B 174B-D, in which Key_B may be stored. The forward entry insert logic 600 may determine the other indices for Key_B 174B-D by performing a hash function on Key_B to generate the indices for Key_B 174B-D or by using Key_B to index a recursive index table (not shown) in which the indices for Key_B 174B-D were stored when Key_B was inserted in location 138. Having determined the other indices associated with Key_B 174B-D processing continues with step 804.

At step 804, the forward entry insert logic 600 (FIG. 6) examines the forwarding entries stored at the locations 148, 158, 166 identified by the indices for Key_B 174B-C. As shown in FIG. 1B, Key_F is stored at location 148 identified by Key_B index_2 174B and Key_F index_2 182B, Key_H is stored at location 158 identified by Key_B index_3 174C and Key_H index_3 186C and Key_I is stored at location 166 identified by Key_B index_4 174D and Key_I index_4 188D. If all the locations 148, 158, 166 identified by the other indices for Key_B 174B-D are in-use as shown in FIG. 1B, processing continues with step 806. If the forward entry insert logic 600 (FIG. 6) finds one of the locations 148, 158, 166 identified by the other indices for Key_B 174B-D is unused, processing continues with step 816.

At step 806, the forward entry insert logic 600 (FIG. 6) determines from Key_C stored in location 146, the other indices for Key_C 806A, 806C-D other than the location identified by the Key_A index_2 172B and the Key_C index_2 176B, in which Key_C may be stored. Having determined the other indices associated with Key_C processing continues with step 808.

At step 808, the forward entry insert logic 600 (FIG. 6) examines the forwarding entries stored at the locations identified by the indices for Key_C 176A, 176D-C. As shown in FIG. 8, location 140 identified by Key_C index_1 176A is unused, Key_G is stored at location 160 identified by Key_C Index_3 176C and Key_G index_3 184C and location 168 identified by Key_C index_4 176D is unused. If any of the locations 140, 160, 168 identified by the indices for Key_C 176A, 176C-D are unused as shown in FIG. 8, processing continues with step 810. If the forward entry insert logic 600 (FIG. 6) finds none of the locations 142, 160, 168 identified by the indices for Key_C 176A, 176C-D are unused, processing continues with step 818.

At step 810, the forward entry insert logic 600 (FIG. 6) moves Key_C from location 146 identified by Key_C index_2 172B and Key_A index_2 172B to location 140 identified by Key_C index_1 176A. Key_A is inserted in location 146 identified by Key_A index_2 172B.

At step 814, Key_A is inserted in an unused location identified by one of the Key_A indices 172A-D.

At step 816, the forward entry insert logic 600 (FIG. 6) moves Key_B from location 138 identified by Key_A index_1 172A and Key_B index_1 174A to an unused location identified by one of the indices for Key_B 174B-D. Key_A is inserted in location 138 identified by Key_A index 1 172A and Key_B index_1 174A At step 818, the forward entry insert logic 600 (FIG. 6) determines from Key_D stored in location 156 identified by Key_A index_3 172C and Key_D index_3 178D, the other indices for Key_D 806A-B, 806D, in which Key_D may be stored. Having determined the other indices for Key_D processing continues with step 820.

At step 820, the forward entry insert logic 600 (FIG. 6) examines the keys stored at the locations identified by the other indices for Key_D 806A-B, 806D. As shown in FIG. 1B, all locations 142, 150, 170 identified by Key_D indices 806A-B, 806D are unused. If any of the locations 142, 150, 170 identified by the indices for Key_D 806A-B, 806D are unused as shown in FIG. 8, processing continues with step 822. If the forward entry insert logic 600 (FIG. 6) finds none of the locations 142, 150, 170 identified by the indices for Key_D 806A-B, 806D is unused, processing continues with step 824.

At step 822, the forward entry insert logic 600 (FIG. 6) moves Key_D from location 156 identified by Key_A index_3 172C to one of the unused locations 142, 150, 170 identified by Key_D indices 806A-B, 806D. Key_A is inserted in location 156 identified by Key_D index 3 178C.

At step 824, the forward entry insert logic 600 (FIG. 6) determines from Key_E stored in location 164 identified by Key_A index_4 172D and Key_E index_4 180D, the other indices for Key_E 180A-C, 180D, in which Key_E may be stored. Having determined the other indices associated with Key_E processing continues with step 826.

At step 826, the forward entry insert logic 600 (FIG. 6) examines the keys stored at the locations identified by the other indices for Key_E 180A-C. As shown in FIG. 1B, locations 144, 152,162 identified by indices for Key_E 180A-C are unused. If any of the locations 144, 152, 162 identified by the indices for Key_E 180A-C are unused as shown in FIG. 1B, processing continues with step 828. If the forward entry insert logic 600 (FIG. 6) finds none of the locations 144, 152, 168 identified by the indices for Key_E 180A-C is unused, processing continues with step 830.

At step 828, the forward entry insert logic 600 (FIG. 6) moves Key_E from location 164 identified by Key_A index_4 172D and Key_E index_4 180D to one of the locations 144, 152, 162 identified by the other indices for Key_E 180A-C. Preferably, Key_E is inserted in first empty location detected, that is, location 144 if the indices for Key_E 180A-C are being searched in the order A-C. Key_A is inserted in location 164 identified by Key_A index_4 172D.

At step 830, the index selection logic 600 (FIG. 6) continues to search for an unused location by examining the forwarding entries stored at other locations shared by the Key_B, Key_C, Key_D and Key_E forwarding entries by examining all the forwarding entries associated with Key_F, Key_G, Key_H and Key_I until a forwarding entry at one of the Key_A indices 172A-D is emptied and Key_A is inserted.

In general, the locations identified by the indices for a key are searched in a predetermined order for example, in A-D order. The key is inserted in the first empty location found. Thus, the entry is inserted at the location identified by index_1 208A, followed by the location identified by index_2 208B, index_3 208C and index_4 208D.

Reordering the forwarding entries in the hash tables provides efficient utilization of the hash tables and increases the probability that a forwarding entry can be inserted in the hash tables when the hash tables are almost full.

Figure 9:
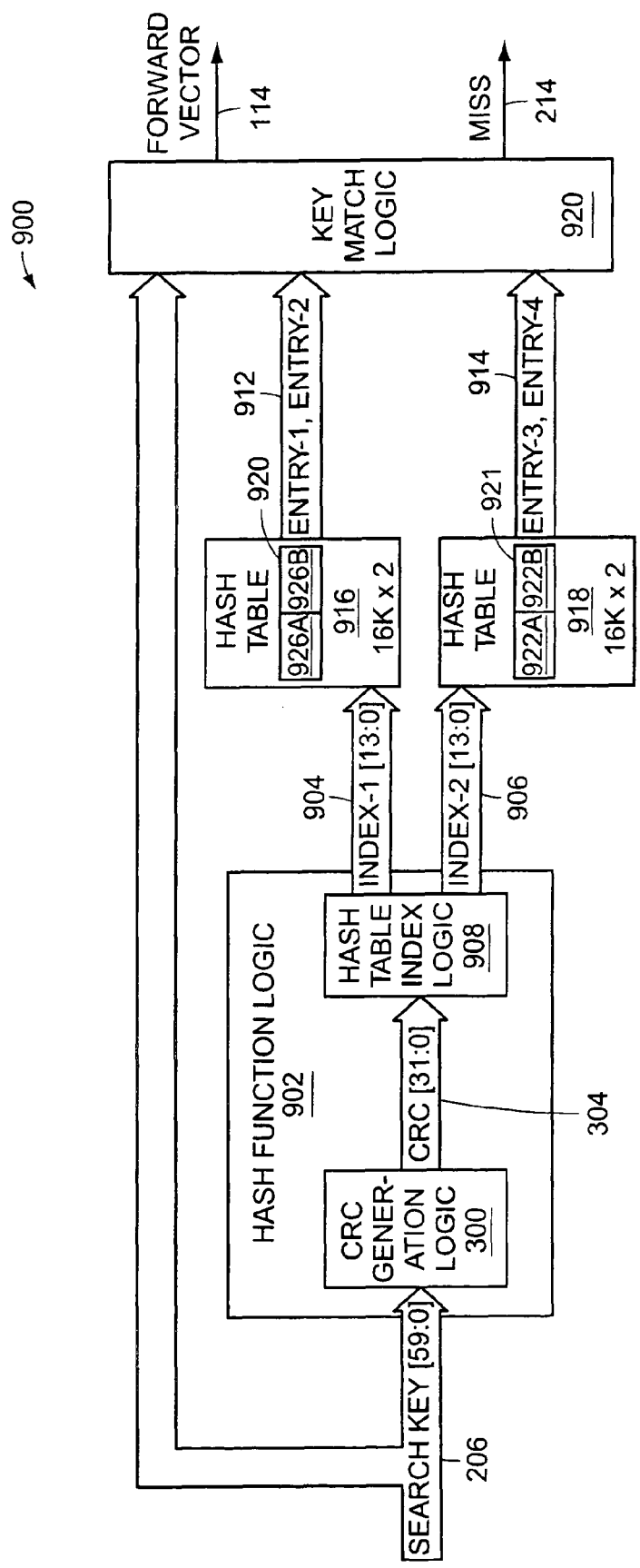
FIG. 9 is a block diagram of a lookup table including two hash tables according to the principles of the present invention.

FIG. 9 is a block diagram of a lookup table 900 including two hash tables 916, 918 according to the principles of the present invention. Each hash table 916, 918 is a separately addressable memory which may be implemented as a Static Random Access Memory (SRAM) or a Dynamic Random Access Memory (DRAM).

The lookup table 900 can be used in a bridge, implementing the Institute of Electrical and Electronic Engineers (IEEE) 802.1 LAN/MAN bridging and management standard to store forward entries for a Media Access Control (MAC) address included in a packet. The MAC address and associated bits in the packet received by the bridge form a large search key 206 for a lookup table. The 60-bit search key 206 is too large for a direct lookup table. Thus, the search key 206 is mapped into a smaller 32-bit hash value which is used to directly index a smaller lookup table.

The 60-bit search key 206 is coupled to hash function logic 902. The hash function logic 902 includes a Cyclic Redundancy Check ("CRC") generation logic 300 and a hash table index logic 908. The hash function is a CRC function which is performed on the search key 206 in the CRC generation logic 300. CRC generation logic is well known to those skilled in the art. The hash function is not limited to CRC generation, the hash function used may be any hash function used by those skilled in the art. The CRC generation logic 300 generates a 32 bit CRC 304 from the 60 bit search key 206.

The 32 bit CRC 304 is forwarded to the hash table index logic 908. The hash table index logic 908 generates two indexes 904, 906 from the 32 bit CRC 304. Each of the two indexes 904, 906 has 14 bits and provides a separate index for a respective one of the hash tables 916, 918. Each hash table has 16K locations. Each of the 16K locations has two buckets. Thus, each hash table can store 32K forward entries. The two indexes are generated by mapping portions of the 32 bit CRC 304 to the two indexes 904, 906 as follows: Bits 13:0 of the CRC 304 are mapped to Bits 13:0 of Index_1 904; Bits 31:18 of the CRC 304 are mapped to 13:0 of Index_2 906. Bits 17:14 of the CRC 304 are not used.

In an alternate embodiment, the CRC can be 28-bits with the most significant 14-bits providing index 904 to hash table 916 and the least significant 14-bits providing index 906 to hash table 918.

Each index 904, 906 points to a location in the respective hash table 916, 918. Each indexed location 920, 921 includes two buckets for storing forward entries including forward vectors. Indexed location 920 includes buckets 926A, 926B. Indexed location 921 includes buckets 922A, 922B. The forward entries stored at each indexed location 920, 921 are forwarded to key match logic 920 to search for a forward vector matching the search key 206 stored in one of the buckets in the indexed locations in the hash tables. If one of the buckets in the indexed locations stores a match for the search key 206, a logical port forward vector 412 (FIG. 4) included in the matching entry is output as the forward vector 114 associated with the search key 206.

In the embodiment shown, each indexed location 920, 921 is capable of storing two forward entries. However, the number of buckets per indexed location is not limited to two. Any number of indexes and buckets are possible. Increasing the number of indexes, increases utilization of the memory in the lookup table. However, as the number of indexes is increased, the logic required for supporting the multiple hash tables in the lookup table such as power supply, address decoder and lines to connect each hash table also increase. There is a tradeoff between increasing the number of buckets and increasing the number of indexes in terms of access speed, hash table size and supporting circuits dependent on the type of memory used and silicon area efficiency.

The number of usable locations in the lookup table is increased by generating two indexes 904, 906 for each search key 206, with each index having two buckets. Also, by providing recursive reordering as described in conjunction with FIG. 7 and FIG. 8, the utilization of the lookup table 900 is increased over the prior art multi-bucket, single lookup table described in conjunction with FIG. 1A.

Figure 10:
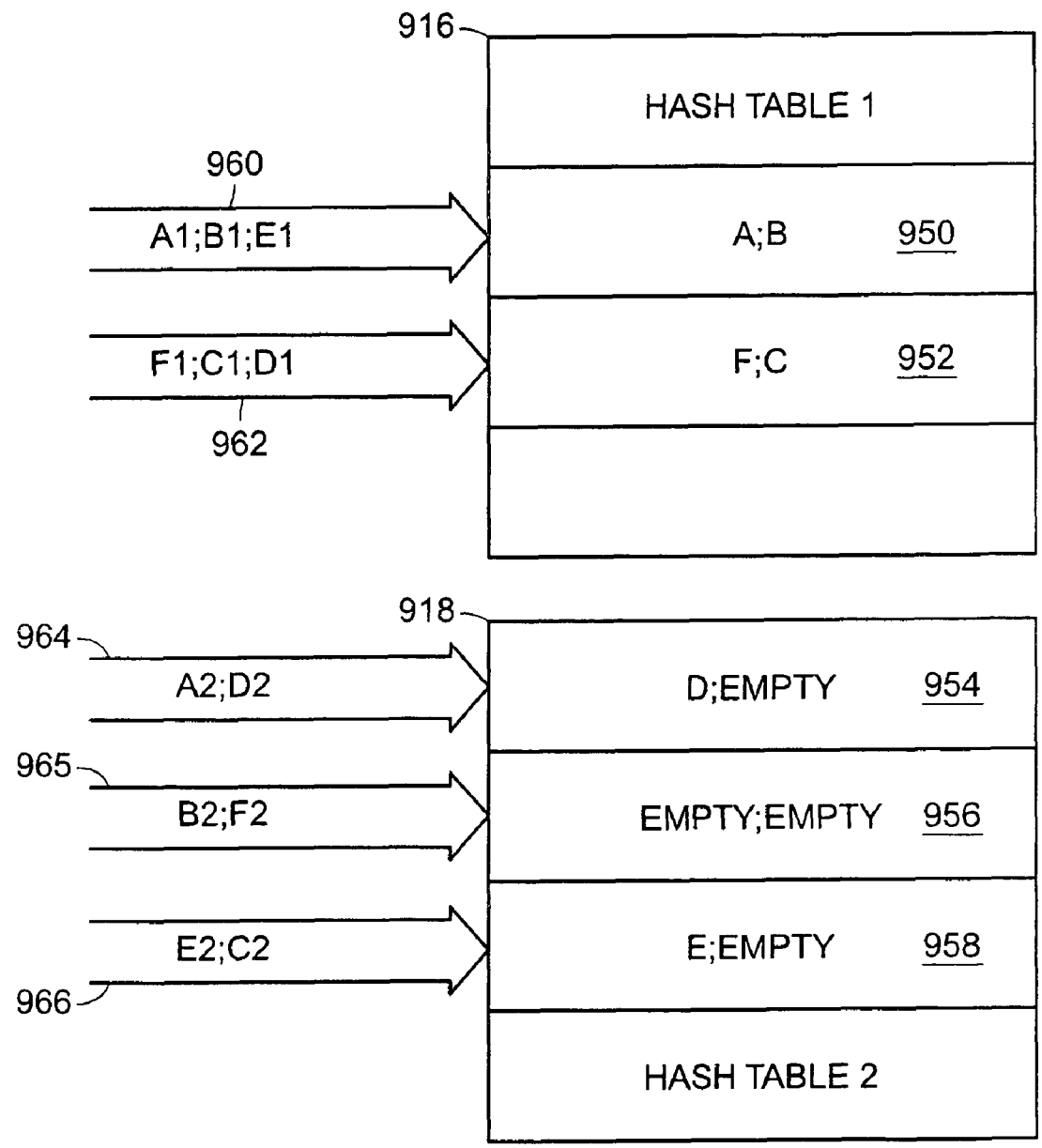

FIG. 10 illustrates indexed locations in two hash tables shown in FIG. 9 shared by a plurality of keys. The 60-bit search key has $2^{60}$ possible values. This is too large an address space to implement a direct lookup with a bucket per search key. Thus, the 60-bit search key 206 is mapped into two smaller $2^{14}$ (16K) address space, for total 32K. Thus, many keys map to the same indexed location in the hash tables. Multiple buckets are provided at each indexed location. To further increase the number of forward entries stored in the lookup table, a plurality of hash functions may be performed on the search key to generate a plurality of indexes for each search key.

Returning to FIG. 9, the hash table index logic 900 concurrently generates a first index 904 for hash table 916 and a second index 906 for hash table 918. A forward entry including a forward vector 114 for the search key 206 is capable of being stored in any of buckets 926A, 926B at indexed location 920 in hash table 916 or any of buckets 922A, 922B at indexed location 921 in hash table 918. However, locations 921 and 920 can be shared by other keys.

Returning to FIG. 10, two separate indexes are generated for each key. As shown, index 1 for Key A (A1) 960 selects location 950 in hash table 916 and index 2 for Key A (A2) 964 selects location 954 in hash table 918. Key B and Key E share location 950 with Key A. Key A is stored in one bucket in location 950 and Key B is stored in the other bucket in location 950. Key D shares location 954 with Key A in hash table 918. Key D is stored in one bucket in location 954.

Generating a plurality of indexes for each key, increases the probability of finding an empty location for storing a forward vector for the key. A plurality of indexes also permits recursive reordering which allows more entries to be stored in the lookup table 900.

More than one index per key increases the number of indexed locations available for storing a match entry for a key. The number of buckets in the table capable of storing forward entries for a key is the same as the prior art four bucket, single index hash table; that is, four buckets per key. However, unlike the prior art, all four buckets are not shared by the same keys. The probability of a plurality of keys mapping to the same entry including two buckets is reduced by generating a plurality of different hash table indexes for each key.

Thus, more keys can be stored in the same size table than in the prior art multi-bucket single index hash table. Also, less silicon area is required than for the four index hash table, with one bucket per indexed location described in conjunction with FIG. 2 since connection lines and logic required to support the four index hash table require more silicon area than the present embodiment. Especially, in an embodiment in which the hash tables are implemented using DRAM-based technology, the aforementioned overhead in the present embodiment may require less area than in the four index hash table. Thus, silicon efficiency required for implementing the lookup table is increased by providing a plurality of separately indexed multi-bucket locations for storing a match for a key.

Figure 11:
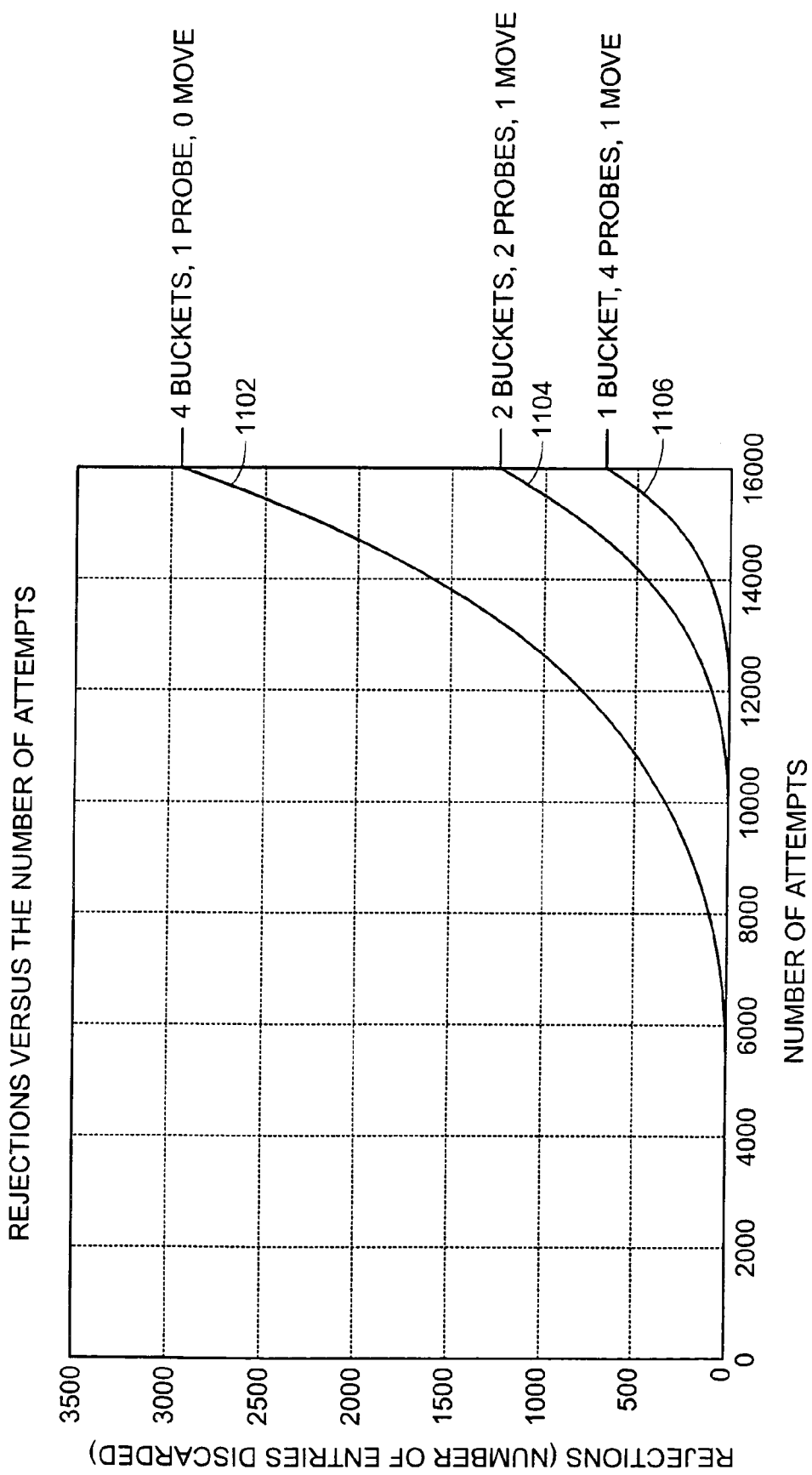
FIG. 11 is a graph illustrating rejected insertion attempts for different hash tables.

FIG. 11 is a graph illustrating rejected insertion attempts for three different hash tables. Plot 1102 represents rejected insertion attempts for the prior art single index, four buckets per index hash table. Each bucket is 4K and a single index is used to select all four buckets. With a single index for all four buckets, no moves are allowed. Thus, when a new insertion attempt fails to find an empty bucket, the attempt is rejected and the entry is not inserted. As shown, 6,000 entries can be inserted without a rejection and there are 750 rejections after 12,000 entries are inserted.

Plot 1104 represents rejected insertion attempts for the two index, two buckets per index hash table described in conjunction with FIG. 9. The two index hash table allows entries to be moved to other locations indexed by the key when a new insertion attempt fails to find an empty bucket at either of the two indexed locations. Plot 1104 represents a single move per insertion failure. When a new insertion attempt fails to find an empty bucket in any of the indexed locations, an attempt is made to move one of the entries to another indexed location not shared by the key. If no empty bucket is found at the other indexed locations, the attempt is rejected. As shown, 750 entries have been rejected after 15K insertions.

Plot 1106 represents rejected insertion attempts for the four index, single bucket per index hash table described in conjunction with FIG. 2. Similar to the two index, two buckets per index hash table described in conjunction with FIG. 9, the four index hash table allows entries to be moved to other locations not shared by the key. With four indexes there are less insert rejections, as shown, after 15K insertions, the number of rejection is below 250.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus, comprising:
   a hash table storage element having stored therein a plurality of hash tables, each hash table including a plurality of storage locations, individual storage locations of the plurality of storage locations capable of storing an entry accessible by an index;
   hash function logic configured to receive a key and to compute a separate index into each of the plurality of hash tables from the key, thereby mapping the key to at least one potential storage location in each of the plurality of hash tables, the number of possible keys greater than the number of storage locations available in the plurality of hash tables; and
   insert logic configured to, responsive to determining that every potential storage location already has a valid entry, move one of the valid entries from one of the potential storage locations to a different storage location available to the one of the valid entries via a second separate index.

2. The apparatus of claim 1, wherein the insert logic computes a second separate index into each of the plurality of hash tables from the one of the valid entries to be moved, and moves the one of the valid entries to be moved to a different storage location indicated by one of the computed second separate indices.

3. The apparatus of claim 1 further comprising:
   key match logic configured to search storage locations identified by computed indices for a second key, and in response to finding a valid matching entry, retrieve the valid matching entry.

4. The apparatus of claim 1, wherein the hash function logic is configured to compute an index by generating a CRC for the key and selecting varying sub-portions of the CRC as the indices into the plurality of hash tables.

5. The apparatus of claim 1, wherein the hash table storage element has stored therein four hash tables and each storage location includes a single bucket configured to store a single entry.

6. The apparatus of claim 1, wherein the hash table storage element has stored therein two hash tables and each storage location includes two buckets each of which is configured to store a single copy.

7. The apparatus of claim 1, wherein each storage location in the plurality of hash tables is shared by two or more keys.

8. The apparatus of claim 1, wherein the key is a Media Access Control address.

9. The network switch of claim 1, wherein the apparatus implements the Institute of Electrical and Electronic Engineers 802.1 LAN/MAN bridging and management standard.

10. The apparatus of claim 1, wherein each hash table is a separately addressable static random access memory.

11. The apparatus of claim 10, wherein each hash table has 16K locations for storing 32K forward entries.

12. The apparatus of claim 1, wherein the insert logic is further configured to, after moving the one of the valid entries to the different storage location, store the key into a portion of the potential storage location from which the valid entry was moved.

13. A method for storing forwarding entries in an apparatus that includes a hash table storage element having stored therein a plurality of tables, each hash table including a plurality of storage locations, individual of the plurality of storage locations capable of storing an entry accessible by an index, the method comprising:
   receiving an entry including a key for storage in the plurality of hash tables;

computing, via a hash function logic circuit, a separate index into each of the plurality of hash tables from the key, thereby mapping the key to at least one potential storage location in each of the plurality of hash tables, the number of possible keys greater than the number of storage locations available in the plurality of hash tables;

determining, via an insert logic circuit, whether every potential storage location already has a valid entry; and if it is determined that every potential storage location already has a valid entry, moving, via the insert logic circuit, one of the valid entries from one of the potential storage locations to a different storage location available to the one of the valid entries via a second separate index.

14. The method of claim 13, further comprising:
determining the different storage location by computing second separate indices into each of the plurality of hash tables using the one of the valid entries to be moved and selecting an available one of the storage locations accessible by one of the second separate indices, and wherein moving one of the valid entries comprises moving said one of the valid entries to the available one of the storage locations.

15. The method of claim 13, further comprising:
searching storage locations identified by computed indices for a second key for a key field matching the second key; and
in response to finding a valid matching entry, retrieving the valid matching entry.

16. The method of claim 13, wherein computing the separate index further comprises:
generating a CRC for the key; and
selecting varying portions of the CRC as the indices into the plurality of hash tables.

17. The method of claim 13, wherein the hash table storage element has stored therein four hash tables and each storage location includes a single bucket configured to store a single entry.

18. The method of claim 13, wherein the hash table storage element has stored therein two hash tables and storage location includes two buckets each of which is configured to store a single entry.

19. The method of claim 13, wherein the apparatus implements the Institute of Electrical and Electronic Engineers 802.1 LAN/MAN bridging and management standard.

20. The method of claim 13, wherein each hash table is a separately addressable dynamic random access memory.

21. The method of claim 19, wherein each hash table has 16K locations for storing 32K forward entries.

22. The method of claim 13, further comprising:
inserting the key into a portion of the potential storage location from which the valid entry was moved.

23. An apparatus, comprising:
a hash table storage element having stored therein a plurality of hash tables, each hash table including a plurality of storage locations, individual of the plurality of storage locations capable of storing an entry accessible by an index;

means for receiving a key and computing a separate index into each of the plurality of hash tables from the key, thereby mapping the key to at least one potential storage location in each of the plurality of hash tables, the number of possible keys being greater than the number of storage locations available in the plurality of hash tables; and means for, in response to determining that every potential storage location already has a valid entry, moving one of the valid entries from one of the potential storage locations to a different storage location available to the one of the valid entries via a second separate index.

24. The apparatus of claim 23, further comprising:
means for inserting the key into a portion of the potential storage location from which the valid entry was moved.

25. An apparatus, comprising:
a hash table storage element having stored therein a plurality of hash tables, each hash table including a plurality of storage locations, individual of the plurality of storage locations capable of storing an entry accessible by an index;

hash function logic configured to receive a key and to compute a separate index into each of the plurality of hash tables from the key, thereby mapping the key to at least one potential storage location in each of the plurality of hash tables, the number of possible keys being greater than the number of storagelocations available in the plurality of hash tables; and insert logic configured to insert the key into the plurality of hash tables, and responsive to determining that every potential storage location already has a valid entry, select one of the potential storage locations as a storage location to overwrite, and overwrite the entry at the selected potential storage location with a new entry.

26. The apparatus of claim 25, wherein the insert logic is configured to randomly select the one of the potential storage as the storage location to overwrite.

27. The apparatus of claim 25, wherein the apparatus implements the Institute of Electrical and Electronic Engineers 802.1 LAN/MAN bridging and management standard.

* * * * *

UNITED STATES PATENT AND TRADEMARK OFFICE
CERTIFICATE OF CORRECTION

Page 1 of 2

PATENT NO.      : 7,990,958 B2
APPLICATION NO. : 11/069635
DATED           : August 2, 2011
INVENTOR(S)     : Brown It is certified that error appears in the above-identified patent and that said Letters Patent is hereby corrected as shown below:

Title Page, item (56), under "FOREIGN PATENT DOCUMENTS", Column 2, Line 1, below
"FOREIGN PATENT DOCUMENTS
EP 365 337 A2 4/1990"
insert -- OTHER PUBLICATIONS
EUROPEAN PATENT OFFICE, International Search Report, International Patent Application No. PCT/CA00/01061, mailed June 15, 2001, 5 pages.
EUROPEAN PATENT OFFICE, Written Opinion, International Patent Application No. PCT/CA00/01061, mailed October 5, 2001, 5 pages.
Reply to Written Opinion, International Patent Application No. PCT/CA00/01061, dated November 20, 2001, 11 pages.
EUROPEAN PATENT OFFICE, International Preliminary Examination Report (IPER), International Patent Application No. PCT/CA00/01061, mailed January 29, 2002, 6 pages.
JAPANESE PATENT OFFICE, First Office Action, Japanese Patent Application No. 527500/2001, mailed November 10, 2009, 4 pages.
Response to First Office Action, Japanese Patent Application No. 527500/2001, dated February 9, 2010, 7 pages. --.

Column 14, line 27, in Claim 3, delete "claim 1" and insert -- claim 1, --.

Column 14, line 43, in Claim 6, delete "copy." and insert -- entry. --.

Column 14, line 48, in Claim 9, delete "network switch" and insert -- apparatus --.

Column 14, line 62, in Claim 13, delete "of tables," and insert -- of hash tables, --.

Column 14, line 66, in Claim 13, delete "in the" and insert -- in one of the --.

Column 15, line 40, in Claim 18, delete "and storage" and insert -- and each storage --.

Signed and Sealed this
Tenth Day of April, 2012

David J. Kappos
*Director of the United States Patent and Trademark Office*

CERTIFICATE OF CORRECTION (continued)
U.S. Pat. No. 7,990,958 B2

Column 15, line 49, in Claim 21, delete "claim 19," and insert -- claim 20, --.

Column 16, line 35, in Claim 25, delete "storagelocations" and insert -- storage locations --.